US008144927B2

(12) United States Patent
Zuro

(10) Patent No.: US 8,144,927 B2
(45) Date of Patent: Mar. 27, 2012

(54) VIDEO IMAGE PROCESSING AND FUSION

(75) Inventor: Gregory Zuro, Portland, OR (US)

(73) Assignee: Max-Viz, Inc., Portland, OR (US)

( * ) Notice: Subject to any disclaimer, the term of this patent is extended or adjusted under 35 U.S.C. 154(b) by 1062 days.

(21) Appl. No.: 12/023,851

(22) Filed: Jan. 31, 2008

(65) Prior Publication Data

US 2009/0196457 A1 Aug. 6, 2009

(51) Int. Cl.
*G06K 9/00* (2006.01)
*H04N 5/33* (2006.01)

(52) U.S. Cl. ................... 382/103; 382/100; 348/164

(58) Field of Classification Search .......... 382/100,
382/103–104, 113, 128–132, 165, 168, 190–191,
382/208–209, 240, 249, 254, 260–264, 268,
382/270–275, 284, 296–300, 305, 38; 348/33,
348/113, 115–118, 164, 218.1, 234, 23.1,
348/280–583, 606–607, 625–631, 742; 358/451,
358/436, 525; 345/560, 605–606, 611, 629;
250/201.9, 330, 332–334, 370.06, 370.09,
250/372; 356/151, 521; 353/31, 85, 94,
353/121–122; 257/440; 600/306; 707/101;
340/578
See application file for complete search history.

(56) References Cited

U.S. PATENT DOCUMENTS

| | | | |
|---|---|---|---|
| 3,745,345 A | 7/1973 | Muehllehner |
| 4,808,826 A | 2/1989 | Lim et al. |
| 5,519,441 A | 5/1996 | Gusuano et al. |
| 5,799,111 A | 8/1998 | Guissin |
| 5,978,518 A | 11/1999 | Oliyide et al. |
| 6,232,602 B1 | 5/2001 | Kerr |
| 6,373,055 B1 | 4/2002 | Kerr |
| 6,806,469 B2 | 10/2004 | Kerr |
| 6,850,642 B1 | 2/2005 | Wang |
| 6,898,331 B2 | 5/2005 | Tiana |
| 6,990,249 B2 | 1/2006 | Nomura |
| 7,064,781 B1 | 6/2006 | Lovette et al. |
| 7,079,251 B2 | 7/2006 | Millerd et al. |
| 7,102,130 B2 | 9/2006 | Kerr |

(Continued)

OTHER PUBLICATIONS

Pizer et al., "Adaptive Histogram Equalization and Its Variations," *Computer Vision, Graphics, and Image Processing*, vol. 39, pp. 355-368, Sep. 1987.

(Continued)

*Primary Examiner* — Samir Ahmed
*Assistant Examiner* — Mehdi Rashidian
(74) *Attorney, Agent, or Firm* — Stoel Rives LLP

(57) ABSTRACT

Processing of image data derived from radiation emanating from a scene and acquired by a multi-channel enhanced vision system renders an image of the scene for display. Detected first and second wavelength bands of radiation produce respective first and second sets of image data that include representations of relatively low contrast, high spatial frequency detail of features of the scene. Nonlinear intensity transformation of data derived from the first and second sets of image data produces, respectively, first and second sets of low dynamic range image data representing, respectively, first and second sets of intensity values. Different pairs of associated intensity values of the first and second sets correspond to different pixels forming an image. The associated intensity values of the different pairs are combined to form fused image data representing brightness levels of the pixels forming a displayed image that exhibits with high brightness and in great detail the features of the scene.

25 Claims, 12 Drawing Sheets

U.S. PATENT DOCUMENTS

| | | |
|---|---|---|
| 7,283,654 B2 * | 10/2007 | McLain .................. 382/128 |
| 7,340,162 B2 | 3/2008 | Terre et al. |
| 2004/0136605 A1 | 7/2004 | Seger et al. |
| 2004/0239798 A1 | 12/2004 | Nayar et al. |
| 2005/0104900 A1 | 5/2005 | Toyama et al. |
| 2006/0104508 A1 | 5/2006 | Daly et al. |
| 2006/0104533 A1 | 5/2006 | Daly et al. |
| 2006/0239582 A1 | 10/2006 | Hyoudou |
| 2007/0002276 A1 | 1/2007 | Hiohara et al. |
| 2007/0035706 A1 | 2/2007 | Margulis |
| 2007/0139520 A1 | 6/2007 | Loce et al. |
| 2008/0019608 A1 | 1/2008 | Zuro |
| 2008/0068520 A1 * | 3/2008 | Minikey et al. ............ 349/11 |
| 2010/0309315 A1 * | 12/2010 | Hogasten et al. ............ 348/164 |

OTHER PUBLICATIONS

Fattal et al., "Gradient Domain High Dynamic Range Compression," *ACM Transactions on Graphics* (*TOG*), vol. 21, No. 3, Jul. 2002.

Reza et al., "Realization of the Contrast Limited Adaptive Histogram Equalization (CLAHE) for Real-Time Image Enhancement," *Journal of VLSI Signal Processing Systems,* vol. 38, No. 1, pp. 35-44, Aug. 2004.

International Search Report and Written Opinion dated Mar. 16, 2009 for International Application No. PCT/US2009/031735.

* cited by examiner

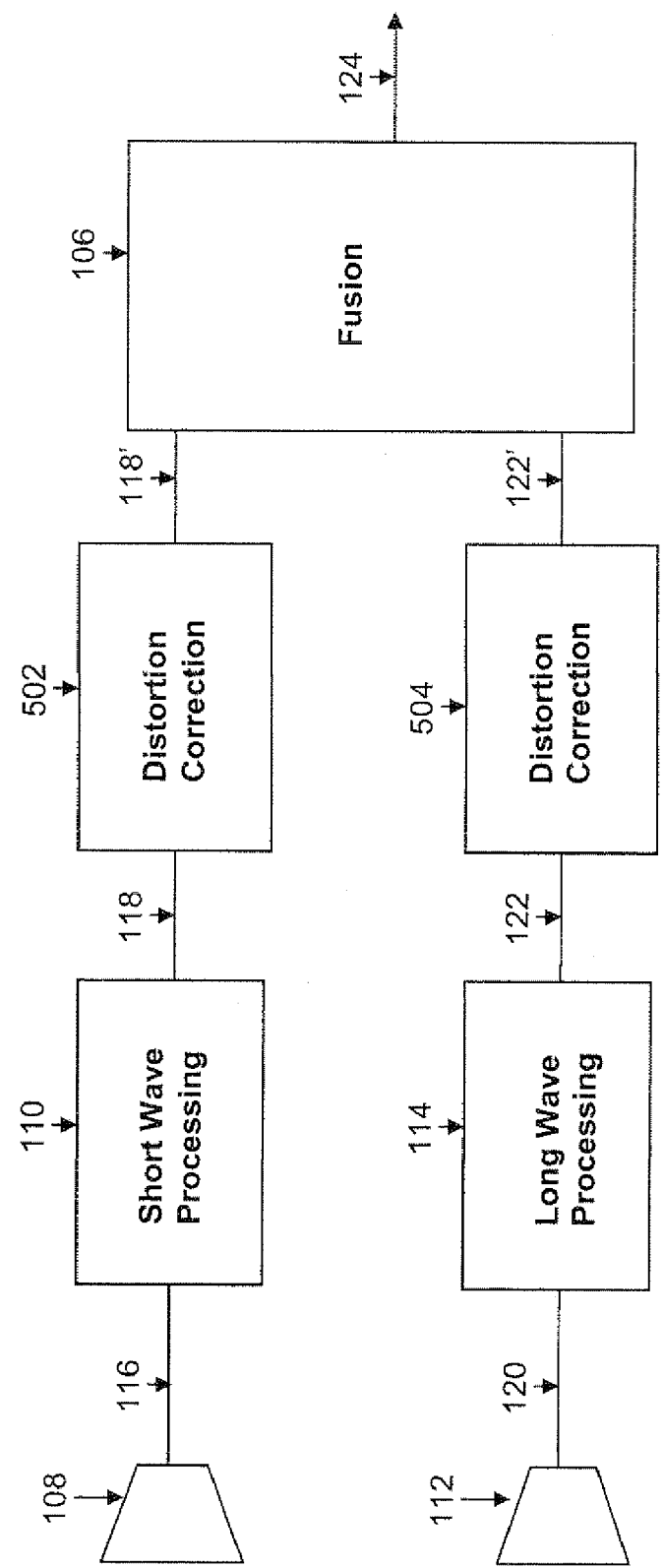

VIDEO IMAGE PROCESSING AND FUSION

TECHNICAL FIELD

This disclosure describes a system and method by which image data of multiple channels and derived from radiation emanating from a scene are processed and fused to render an image of the scene for display. The system and method process and fuse image data from multiple channels in such a way that the corresponding image exhibits features of spatial regions of the scene with high brightness and in great detail.

BACKGROUND INFORMATION

Enhanced vision systems (EVS), such as those used in aircraft, are used to detect infrared radiation or visible light emanating from a scene. In the case of infrared radiation, typical EVS include one or more detectors that detect short-wavelength infrared radiation (SWIR) and long-wavelength infrared radiation (LWIR). These systems process the SWIR and LWIR with use of a single channel or with separate short-wave (SW) and long-wave (LW) channels.

Typical EVS using multiple channels process and combine (or fuse) SWIR and LWIR through a light skimming approach. In this approach, the SW channel extracts peaks or local maxima of a SWIR signal to identify centers of SW radiation sources, such as runway lights. The peaks or local maxima are used to generate a SW video signal in which the peaks or local maxima are represented as a pattern of computer generated symbols, such as dots. The LW channel processes the LWIR to generate a LW video signal representing a background scene. Thereafter, the SW video signal is combined with the LW video signal to generate a final image—the only contribution to the final image from the SW channel being the pattern of computer generated dots. Examples of such multiple-channel EVS are described in U.S. Pat. Nos. 6,232,602; 6,373,055; 6,806,469; and 7,102,130.

Furthermore, typical multi-channel systems implement an iris control feature in which an average signal level of a SWIR signal is fed back to control an iris position of a SW detector. With this approach, the iris of the SW detector is controlled to maintain the average signal level of the SWIR signal at a preset level.

Typical multi-channel systems work well in original situational awareness applications. Shortcomings in typical multi-channel systems, however, become apparent in certain applications. For example, in approach and landing scenarios for aircraft, it is necessary to detect runway lights more quickly and in worse atmospheric conditions. As the SW channel of a typical multi-channel system is operated at higher gain to achieve earlier detection, image artifacts in the form of extreme blooming of the runway lights are displayed. This light blooming can be so extreme as to obscure any useful image of the runway environment. Thus, a need exists for a multi-channel enhanced vision system that performs well under all conditions, including those in which the SWIR gain is set very high to allow early detection of SW radiation sources. A need also exists for a multi-channel system that is capable of displaying fine image detail that includes contribution from very sensitive SWIR.

SUMMARY OF THE DISCLOSURE

The preferred embodiments disclosed achieve processing of image data derived from radiation emanating from a scene and acquired by a multi-channel enhanced vision system to render an image of the scene for display. The image exhibits features of spatial regions of the scene with high brightness and in great detail. First and second wavelength bands of radiation emanating from a scene are detected to produce respective first and second sets of image data that include representations of relatively low contrast, high spatial frequency detail of features of spatial regions of the scene. Nonlinear intensity transformation of data derived from the first set and second set of image data is performed to produce, respectively, a first set of low dynamic range image data representing a first set of intensity values and a second set of low dynamic range image data representing a second set of intensity values. Different pairs of associated intensity values of the first and second sets correspond to different pixels forming an image of the scene. The associated intensity values of the different pairs are combined to form fused image data representing brightness levels of the pixels forming an image that, when rendered on a display, exhibits with high brightness and in great detail the features of the spatial regions of the scene.

This approach allows for early detection of images of a scene and facilitates the display of fine image detail. While the above-described airborne application is of interest, the approach is appropriate across a wide range of multi-channel imaging systems. The preferred embodiments implement an elegant, practical solution to the problem of image artifacts, such as extreme light blooming.

Additional aspects and advantages will be apparent from the following detailed description of preferred embodiments, which proceeds with reference to the accompanying drawings.

BRIEF DESCRIPTION OF THE DRAWINGS

FIGS. 5a and 5b are block diagrams of the system of FIG. 1 including distortion correction units to allow accurate overlay of data from different channels.

DETAILED DESCRIPTION OF PREFERRED EMBODIMENTS

Figure 1:
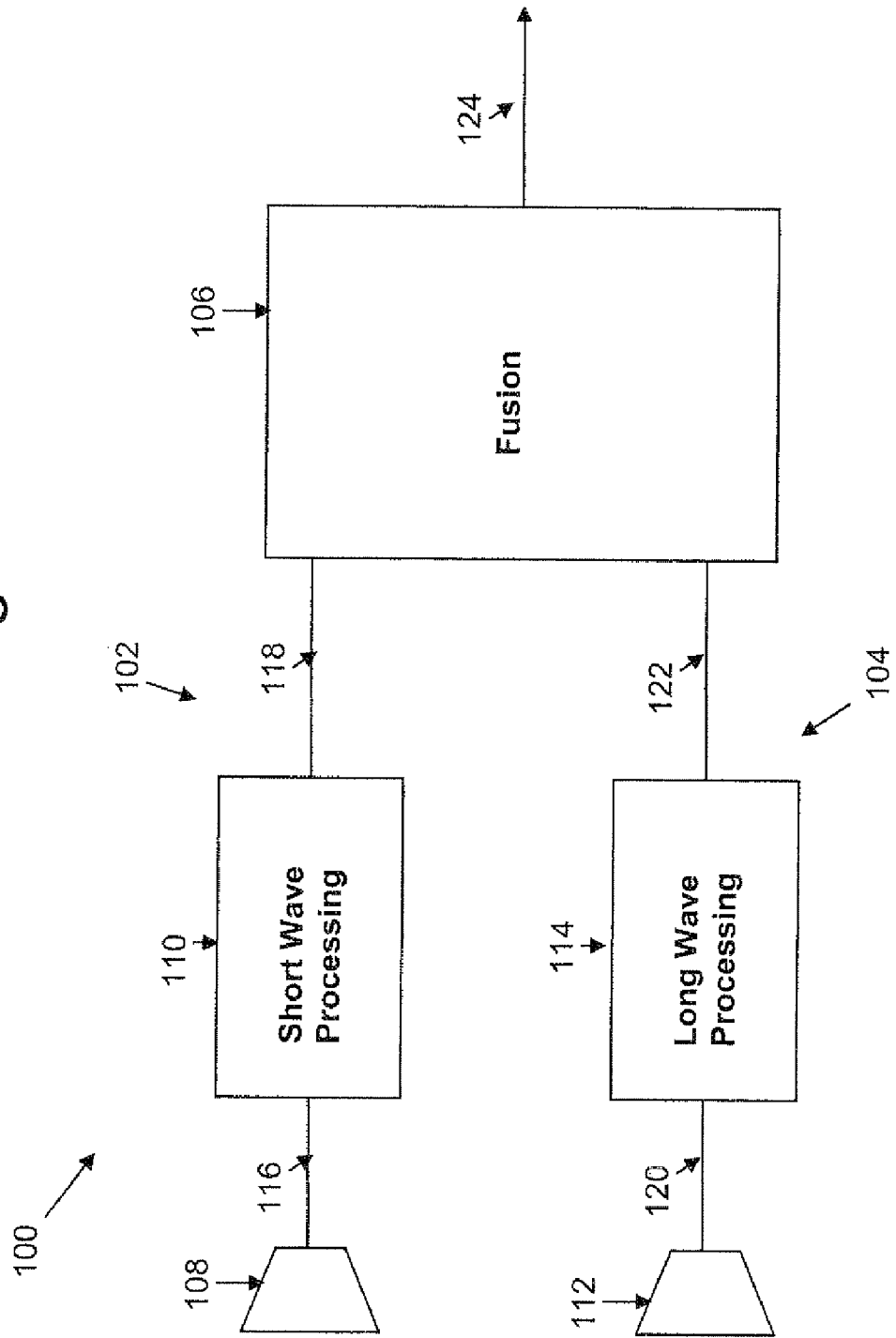
FIG. 1 is a block diagram of a first embodiment of a multi-channel system that implements nonlinear intensity transformation and fusion.

The preferred embodiments include a number of modular processing units existing as computer algorithms implemented in a general processing unit or as hardware constructs in, for instance, a field programmable gate array (FPGA). FIG. 1 is a block diagram of a first embodiment of a multi-channel enhanced vision system 100. System 100 includes a short wave (SW) channel 102, sensitive to short wavelength radiation, a long wave (LW) channel 104, sensitive to long wavelength radiation, and a fusion unit 106. Short wavelength radiation includes infrared radiation with wavelengths ranging between 0.7 μm and 3 μm, preferably between 1.4 μm and 3 μm. Long wavelength radiation, also known as thermal infrared radiation, includes infrared radiation with wavelengths ranging between 3 μm and 15 μm, preferably between 8 μm and 15 μm.

SW channel 102 includes a SW detection unit 108 and a SW processing unit 110. LW channel 104 includes a LW detection unit 112 and a LW processing unit 114. Although SW detection unit 108 and LW detection unit 112 are shown as separate blocks in FIG. 1, these units may be combined into a single detection unit capable of detecting, and distinguishing between, short wavelength radiation and long wavelength radiation.

SW detection unit 108 detects short wavelength radiation emanating from a scene and produces a SW high dynamic range (HDR) signal 116 representing the detected short wavelength radiation. SW HDR signal 116 is processed by SW processing unit 110 to produce a SW low dynamic range (LDR) signal 118. SW LDR signal 118 includes SW image data that represent intensity values—for example, light intensity values—of different pixels of a SW image to be displayed.

LW detection unit 112 detects long wavelength radiation emanating from the scene and produces a LW HDR signal 120 representing the detected long wavelength radiation. LW HDR signal 120 is processed by LW processing unit 114 to produce a LW LDR signal 122. LW LDR signal 122 includes image data that represent intensity values—for example, light intensity values—of different pixels of a LW image to be displayed.

Each pixel of an image to be displayed includes contribution from SW LDR signal 118 and LW LDR signal 122. For a given pixel, a corresponding SW intensity value represented in SW LDR signal 118 and a corresponding LW intensity value represented in LW LDR signal 122 are combined by fusion unit 106 to produce a fused intensity value for that pixel, the fused intensity value being represented in a fused signal 124. Each pixel represented by a fused intensity value of fused signal 124 includes contributions from both SW channel 102 and LW channel 104 to produce an image that, when rendered on a display, exhibits with high brightness and in great detail the features of the spatial regions of the scene. The image may be displayed on any display device including, for example, a head-up display or a head-down display.

Figure 2:
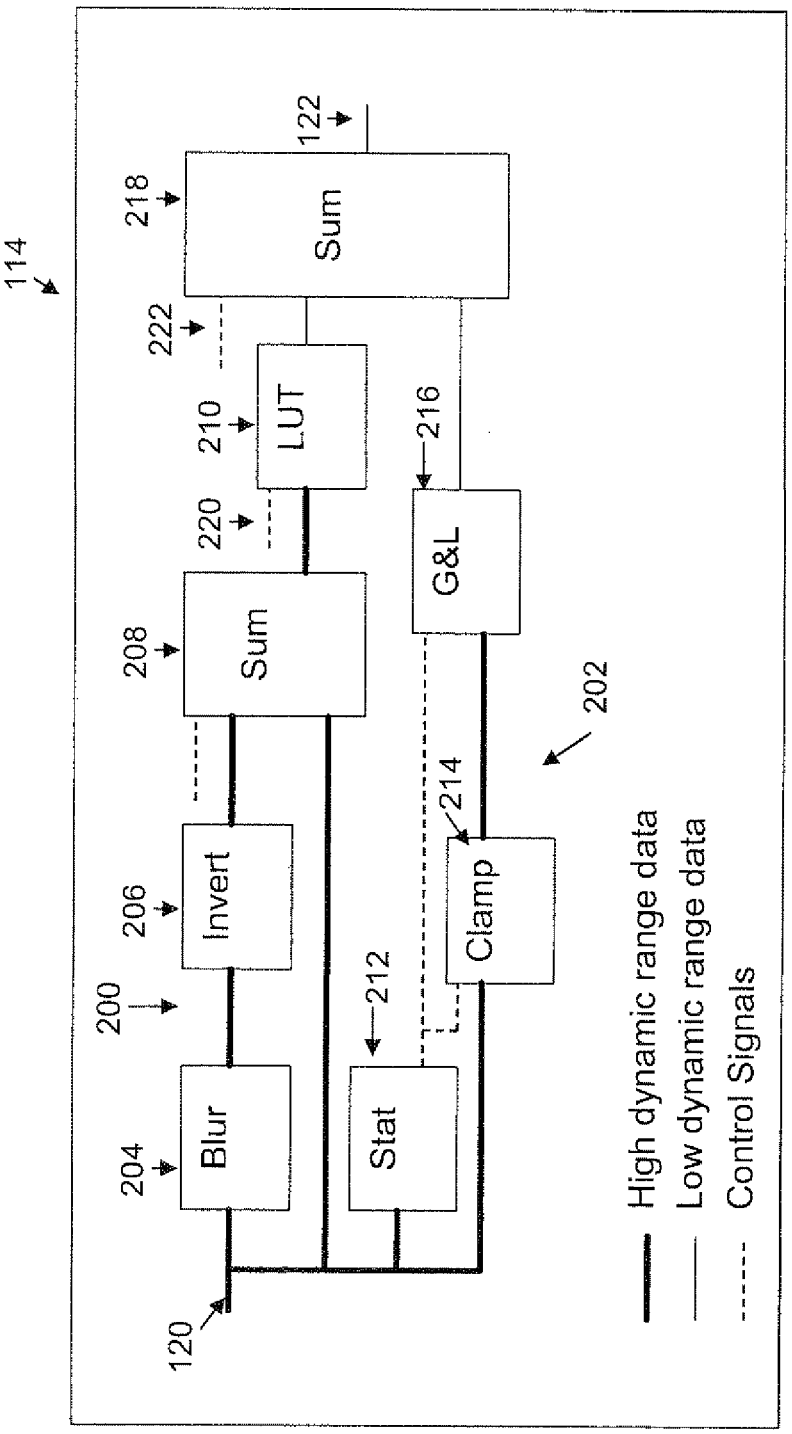
FIG. 2 is a block diagram of a long wave processing unit of the system of FIG. 1.

LW processing unit 114 will now be described in more detail. LW processing unit 114 is fully described in U.S. patent application Ser. No. 11/491,449, filed Jul. 20, 2006. FIG. 2 is a block diagram representing LW processing unit 114. LW processing unit includes a high spatial frequency processing channel 200 and a low spatial frequency processing channel 202. High spatial frequency processing channel 200 includes a blurring spatial filter 204, an inverting unit 206, a summing unit 208, and a dynamic look-up table 210. Low spatial frequency processing channel 202 includes a statistics unit 212, a clamping unit 214, and a dynamic gain and level unit 216. LW HDR signal 120 is applied to blurring spatial filter 204, summing unit 208, statistics unit 212, and clamping unit 214. In an alternative embodiment LW HDR signal 120 is applied to the inputs of blurring spatial filter 204, summing unit 208, and statistics unit 212; and the output of blurring spatial filter 204 is applied to the input of clamping unit 214. The following description is directed to the first embodiment.

Blurring spatial filter 204, inverting unit 206, and summing unit 208 combine to form a high pass filter to process the incoming high bandwidth image data of LW HDR signal 120. Summing unit 208 adds the image data of LW HDR signal 120 and the blurred and inverted image data derived from units 204 and 206 and divides the result by two to maintain the same dynamic range as that of the image data of LW HDR signal 120. The desired effective kernel size of the high pass filter is fixed and is determined within blurring spatial filter 204.

Figure 10:
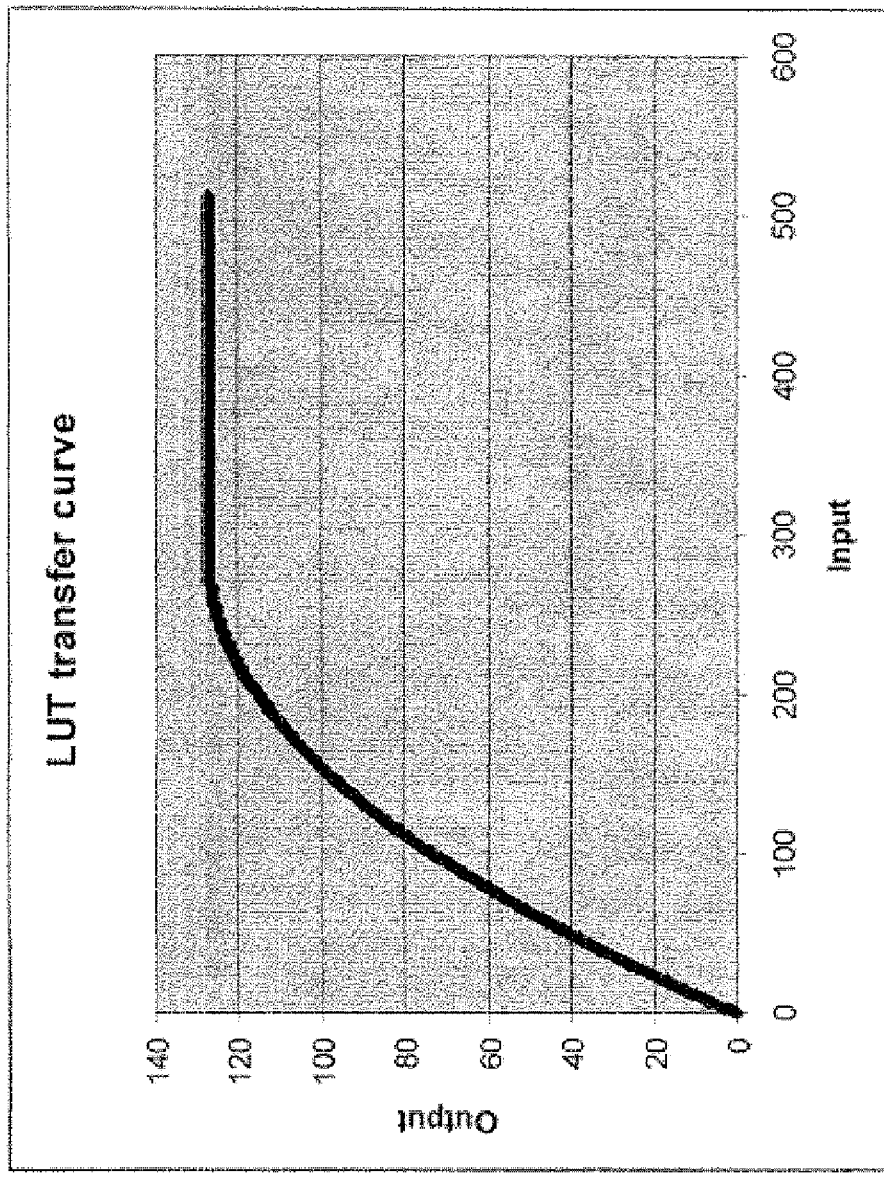
FIG. 10 is an example of a transfer curve stored in a look-up table processing unit module of the systems of FIGS. 1 and 8.

The output of summing unit 208 is delivered to dynamic look-up table 210, which applies an intensity transform to the high-pass filtered image data produced by summing unit 208. This transform is designed to minimize visible artifacts of the high pass filter, most specifically spatial halos around objects of very high or low intensity relative to their surroundings. A typical transform curve is shown in FIG. 10. The X-axis represents the absolute difference between the high pass image input to dynamic look-up table 210 and the implicit average value of those data that will always be on-half of the dynamic range.

The actual values of this transform depend upon the input image data of LW HDR signal 120 characteristics. Dynamic look-up table 210 has a control signal input 220 that determines from a library of transform curves which transform curve to apply. This curve is chosen based on the dynamic range of LW HDR signal 120. If the dynamic range is low, then a curve or look-up table with a higher output to input ratio (gain) may be selected. The subjective goal is to produce an output image, the dynamic range of which covers at least one-fourth of the dynamic range of an output display device. The maximum output value of dynamic look-up table 210 is preferably no more than one-half of the dynamic range of the output display device. The gain implicit in dynamic look-up table 210 is partly determined by the characteristic response of LW detector 112 and is, therefore, determined experimentally. The transform curve selected from dynamic look-up table 210 may be changed between successive images. Generally, the most common stimuli are represented by input values that fall below the asymptotic limit, which is approximately 255 for the example of dynamic look-up table 210, shown in FIG. 10.

Statistics unit 212 calculates the mean of LW HDR signal 120 and transmits that mean value to clamping unit 214. Clamping unit 214 limits the intensity extent of the HDR image data of LW HDR signal 120 to a certain amount around the mean value calculated by statistics unit 212. In the alternative embodiment, clamping unit 214 limits the intensity extent of the blurred image data produced by blurring spatial filter 204.

Dynamic gain and level unit 216 determines and applies a gain and level intensity transform to the clamped image data produced by clamping unit 214. This transform determines the minimum and maximum intensity extent of the incoming image data. These limits, along with the mean calculated by statistics unit 212, are used to calculate a gain that is then applied to the incoming image data. The gain is preferably determined as follows:

```
If (mean – min) < (max–mean), then
    Gain = low-range/[(mean–min)*2]
Else
    Gain = low-range/[(max–mean)*2]
End,
```

Where 'Gain' is the gain applied to the incoming image data intensity values, 'low-range' is the number of possible low-dynamic range output intensities, 'mean' is the mean input intensity value calculated by statistics unit 212, 'min' is the minimum input intensity observed by dynamic gain and level unit 216, and 'max' is the maximum input intensity observed by dynamic gain and level unit 216.

A variable summing unit 218 combines the high frequency data from dynamic look-up table 210 with the low frequency data from gain and level unit 216. Variable summing unit 218 has a control signal input 222 that determines the ratio of high spatial frequency to low spatial frequency data. This is a subjective measure that may be determined by an observer. The outputs of dynamic look-up table 210, gain and level unit 216, and variable summing unit 218 produce signals representing LW LDR image data. Particularly, summing unit 218 produces LW LDR signal 122 that is fused with SW LDR signal 118. This approach ensures that the mean value of the high-dynamic range image data is always represented in the low-dynamic range scene as the mid-range intensity of that low range.

An Alternative determination of the gain is as follows:

Gain=low-range/(max–min).

The difference between the alternative method and the preferred method is that the former does not perform the "centering" of the output image intensity.

Figure 3:
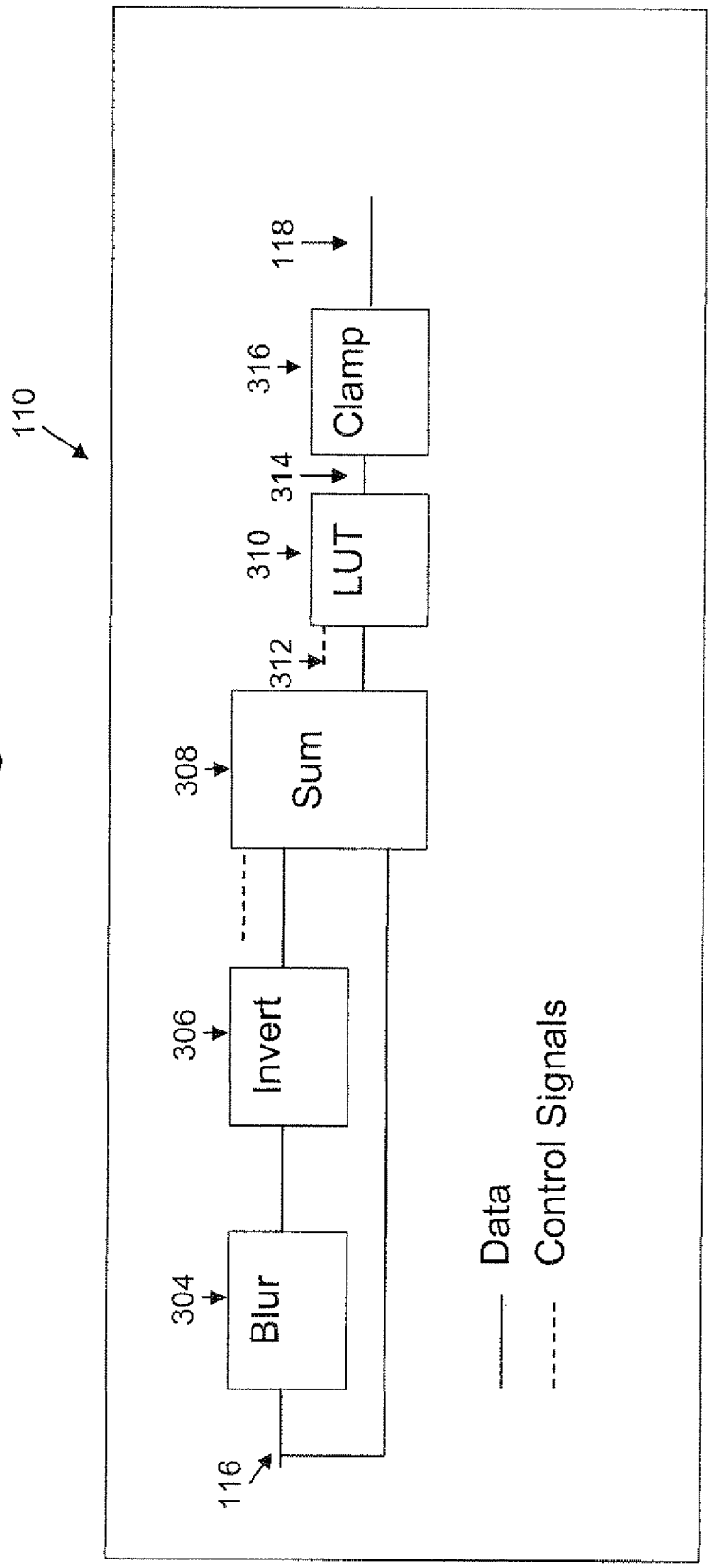
FIG. 3 is a block diagram of a short wave processing unit of the system of FIG. 1.

SW processing unit 110 will now be described in more detail. FIG. 3 is a block diagram representing SW processing unit 110. SW processing unit 110 includes a blurring spatial filter 304, an inverting unit 306, a summing unit 308, and a dynamic look-up table 310. Blocks 304, 306, 308, and 310 operate in a manner similar to that of blocks 204, 206, 208, and 210 of long wave processing unit 114. SW HDR signal 116 is applied to the inputs of blurring spatial filter 304 and summing unit 308. Blurring spatial filter 304, inverting unit 306, and summing unit 308 combine to form a high pass filter to process the incoming high bandwidth image data of SW HDR signal 116. Summing unit 308 adds the image data of SW HDR signal 116 and the blurred and inverted image data derived from units 304 and 306 and divides the result by two to maintain the same dynamic range as that of the image data of SW HDR signal 116. The desired kernel size of the high pass filter is fixed and is determined within blurring spatial filter 304.

The output of summing unit 308 is delivered to dynamic look-up table 310, which applies an intensity transform to the high-pass filtered image data produced by summing unit 308. Similar to the transform of dynamic look-up table 210, the transform of dynamic look-up table 310 is designed to minimize visible artifacts of the high pass filter, most specifically spatial halos around objects of very high or low intensity relative to their surroundings. A typical transform curve is shown in FIG. 10. The X-axis represents the absolute difference between the high pass image input to dynamic look-up table 310 and the implicit average value of those data that will always be one-half of the dynamic range.

The actual values of this transform depend upon the input image data of SW HDR signal 116 characteristics. Dynamic look-up table 310 has a control signal input 312 that determines, from a library of transform curves which transform curve to apply. This curve is chosen based on the dynamic range of SW HDR signal 116. If the dynamic range is low, then a curve or look-up table with a higher output to input ratio (gain) may be selected. The subjective goal is to produce an output image, the dynamic range of which covers at least one-fourth of the dynamic range of an output display device. The maximum output value of dynamic look-up table 310 is preferably no more than one-half of the dynamic range of the output display device. The gain implicit in dynamic look-up table 310 is partly determined by the characteristic response of SW detector 108 and is, therefore, determined experimentally. The transform curve selected from dynamic look-up table 310 may be changed between successive images. Generally, the most common stimuli are represented by input values that fall below the asymptotic limit, which is approximately 255 for the example of dynamic look-up table 310, shown in FIG. 10.

Figure 4B:
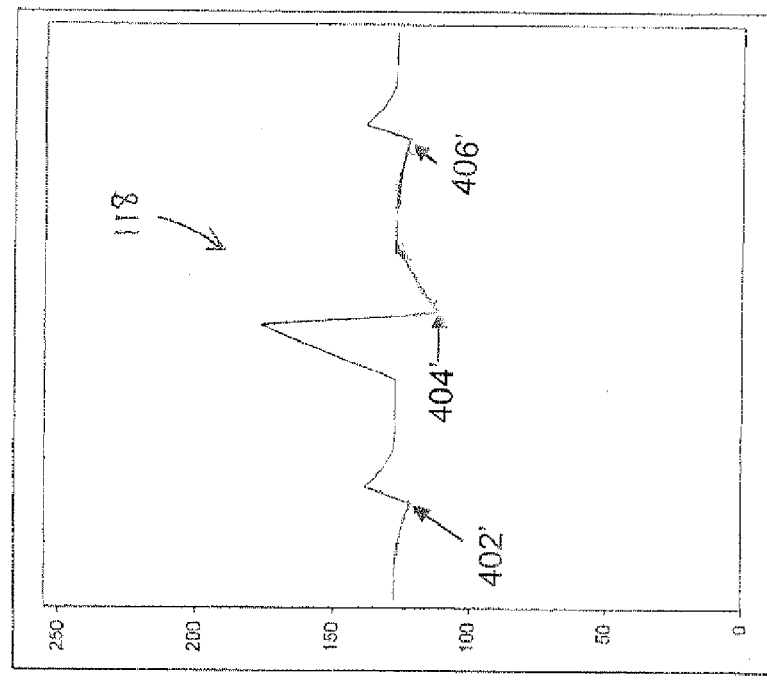
FIGS. 4a and 4b are arbitrary waveforms produced at the outputs of their associated processing unit modules of the short wave processing unit of FIG. 3.
Figure 4A:
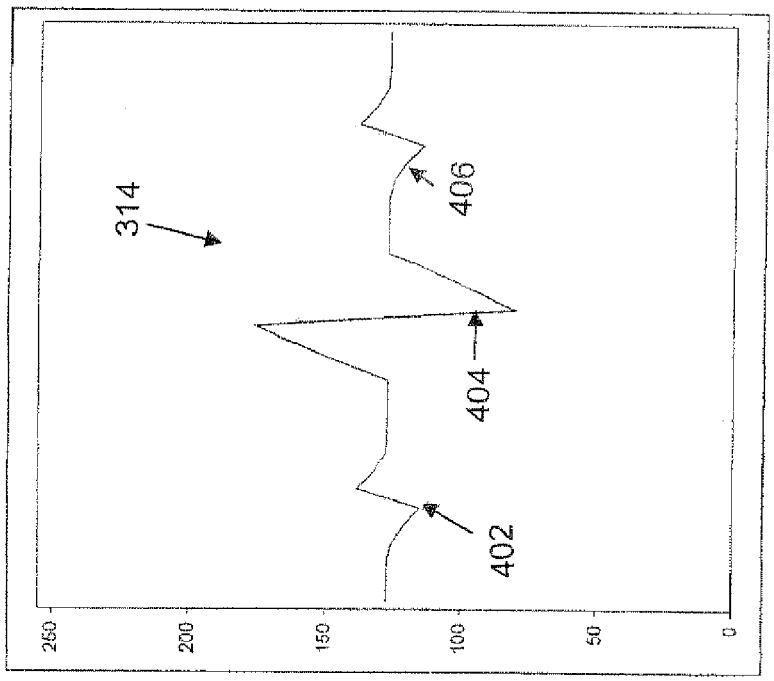

The output of dynamic look-up table 310 produces a signal 314 representing SW LDR image data. Signal 314 is delivered to a clamping unit 316 to further minimize any remaining visible artifacts. For example, signal 314 may include negative going excursions that represent shadows around bright objects. Clamping unit 316 clamps the negative going excursions to produce an improved image. FIGS. 4a and 4b depict arbitrary waveforms of signal 314 before clamping and SW LDR signal 118 after clamping. Negative going excursions 402, 404, and 406 are clamped to produce, respectively, clamped excursions 402', 404', and 406'. SW processing unit 110 and LW processing unit 114 both effectively transform HDR signals to LDR signals while substantially preserving or enhancing local area detail of a detected scene.

Figure 5B:
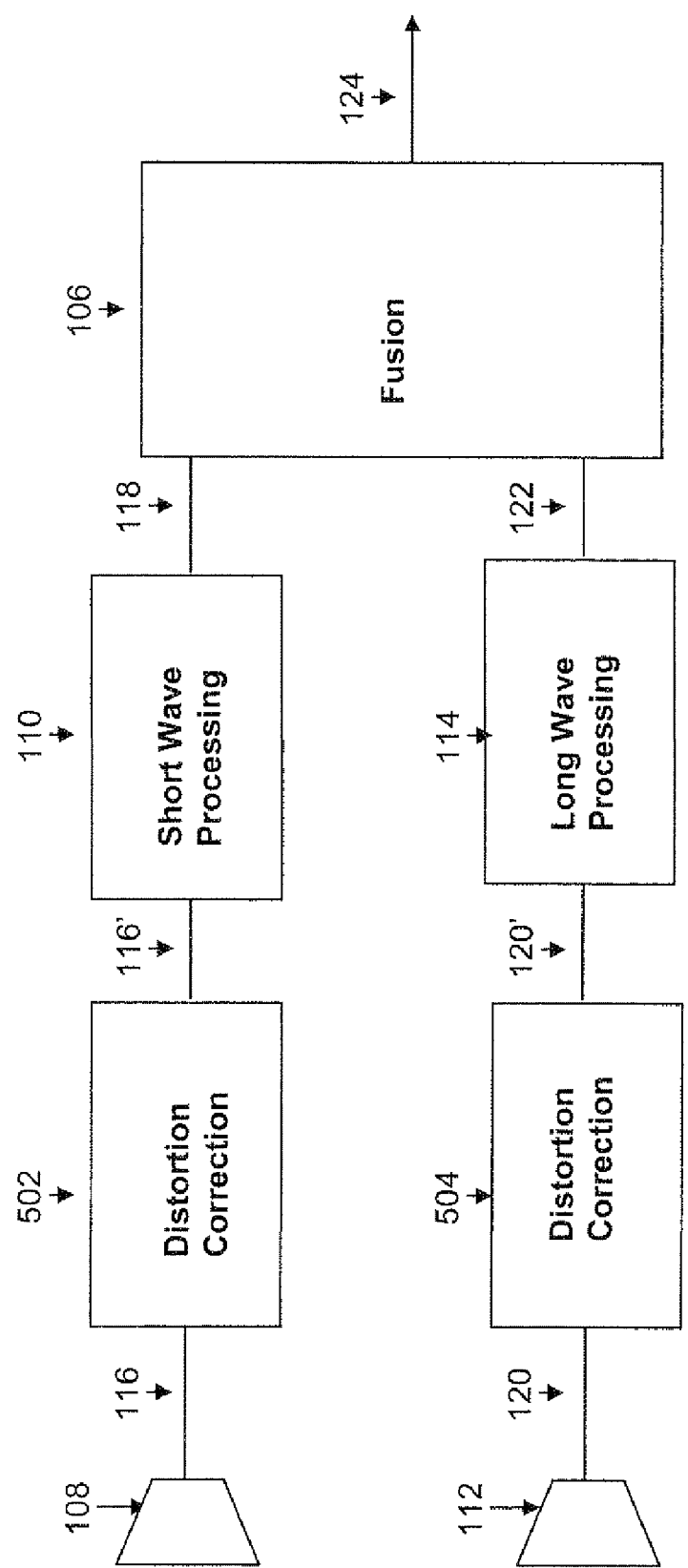

The first embodiment of multi-channel enhanced vision system 100 may include a distortion correction feature. FIGS. 5a and 5b depict enhanced vision system 100 implemented with a SW distortion correction unit 502 and a LW distortion correction unit 504. SW distortion correction unit 502 and LW distortion correction unit 504 receive, respectively, LDR signals 118 and 122 from SW processing unit 110 and LW processing unit 114 (FIG. 5a). Alternatively, SW distortion correction unit 502 and LW distortion correction unit 504 receive, respectively, HDR signals 116 and 120 from SW detection unit 108 and LW detection unit 112 (FIG. 5b). In other words, distortion correction may be performed before or after transformation carried out in SW processing unit 110 and LW processing unit 114.

The operations of distortion correction units 502 and 504 will now be described in more detail. Each pixel of an image generated by system 100 has a corresponding intensity value. Each intensity value has corresponding SW and LW intensity value components represented in LDR signals 118 and 122. Alternatively, in the arrangement of FIG. 5b, the SW and LW intensity values may be HDR intensity values represented in HDR signals 116 and 120. During processing, image systems may produce pixel position, or offset, errors. Unless these offset errors are compensated for, fusion of the SW and LW intensity values, offset from one another, may degrade fine image detail. Distortion correction units 502 and 504 facilitate accurate overlay of the SW and LW intensity values. Each distortion correction unit 502 and 504 uses offset values associated with offset errors to produce LDR signals 118', 122' (FIG. 5a) or HDR signals 116' and 120' (FIG. 5b) representing corrected intensity values. Offset values may be determined using numerous different methods known to skilled persons. For example, one possible method is to measure the offset between two video images. With this approach, a camera unit may be mounted such that it can be precisely rotated in elevation. The camera unit may be aimed at a linear array of targets that have both LW and SW emitters mounted such that their lateral separation is approximately identical to the lateral separation of LW and SW detectors of the camera unit. At several different elevation angles, LW and SW video frames are captured in a video image capture interface to a computer. From the video images, the location of the LW and SW emitters within the image is collected as a function of elevation angle. The offset values between the LW and SW emitter images may be extracted for use by distortion correction units 502 and 504.

Figure 5C:
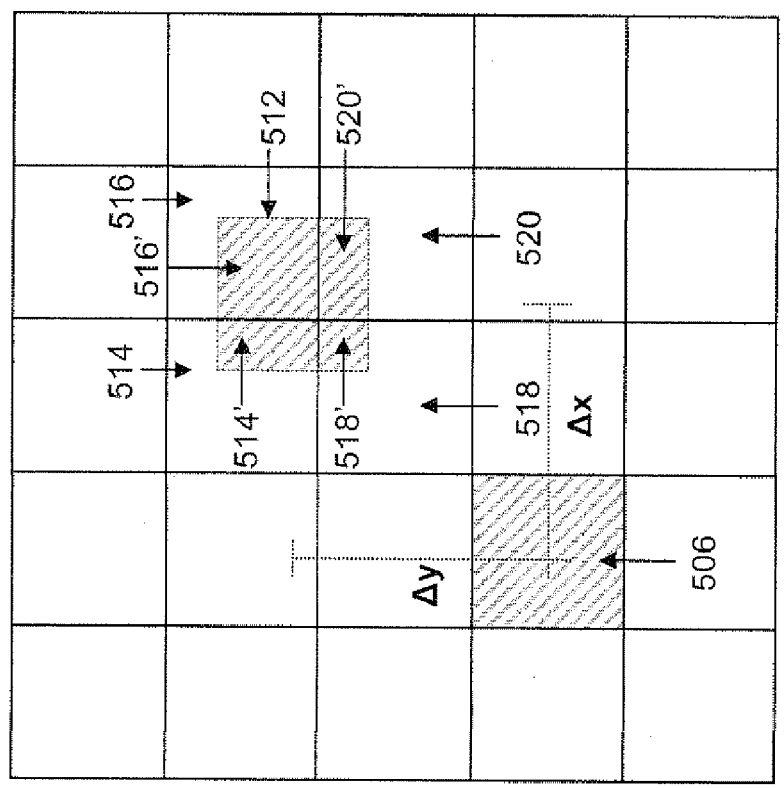
FIG. 5c is a graphical representation of the distortion correction process implemented by the distortion correction units of FIGS. 5a and 5b.

Distortion correction in each channel may be implemented as follows. For clarity, distortion correction will be described with reference to only SW channel 102. Distortion correction of LW channel 104, however, is implemented in a manner similar to SW channel 102. FIG. 5c is a pictorial representation of the operation of distortion correction units 502 and 504. FIG. 5c depicts a pixel at a nominal location 506 and a corresponding offset pixel at an offset location 512, which is offset from nominal location 506 by offset values $\Delta x$, $\Delta y$. Offset values $\Delta x$, $\Delta y$, as described above, may be predetermined and stored in a look-up table. Offset values $\Delta x$, $\Delta y$ position the offset pixel at location 512 such that the offset pixel is partly superimposed on each of a group of four adjacent pixel regions 514, 516, 518, and 520. Each pixel region in the group has an associated weight value assigned to it that is proportional to the areas 514', 516', 518', and 520' dictated by the position of the offset pixel at offset location 512. Similar to offset values $\Delta x$ and $\Delta y$, the weight values are predetermined and stored in a look-up table. During real time processing of data representing a SW intensity value of the pixel at nominal location 506, offset values $\Delta x$, $\Delta y$ and weight values for pixel regions 514, 516, 518, and 520 are referenced. Offset values $\Delta x$, $\Delta y$ identify data representing the SW intensity values of adjacent pixels associated with pixel regions 514, 516, 518, and 520. The intensity values of these adjacent pixels are used, together with the associated weight values, to determine a weighted average intensity value of the adjacent pixels. The weighted average intensity value is assigned as the intensity value of the pixel at nominal location 506. This process is repeated for each pixel, in each channel.

Figure 6:
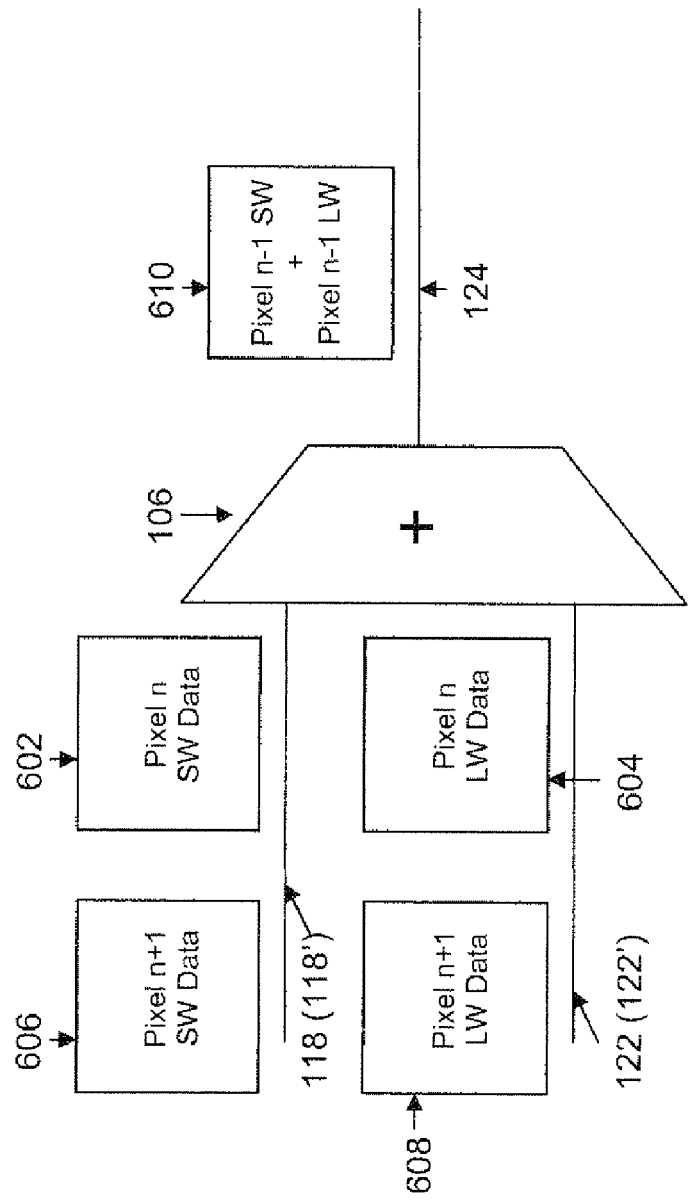
FIG. 6 is a graphical representation of a fusion process implemented by the system of FIG. 1.

Fusion unit 106 and an associated fusion process will now be described in more detail. Fusion unit 106 receives LDR signals 118 and 122 from processing units 110 and 114, or LDR signals 118' and 122' from distortion correction units 502 and 504, representing SW and LW intensity values of pixels and outputs fused signal 124 representing a fusion of the SW and LW intensity values. Different pairs of associated intensity values of SW channel 102 and LW channel 104 correspond to different pixels forming an image of a scene. FIG. 6 is a pictorial representation of the fusion process. FIG. 6 depicts SW intensity value 602 paired up with LW intensity value 604 for a corresponding pixel n. Intensity values 606 and 608 are likewise paired up for a corresponding pixel n+1. Fusion unit 106 performs weighted addition of the paired-up SW and LW intensity values on a pixel by pixel basis. An intensity value 610 represents the fused SW and LW intensity values for a corresponding pixel n−1. Intensity value 610 is equal to the SW intensity value plus the LW intensity value. Fusion unit 106 may also lower intensity value 610 by subtracting from intensity value 610 a predetermined intensity amount. Every pixel of an image to be displayed includes contributions from SW channel 102 and LW channel 104. Fusion by simple addition allows system 100 to produce an image exhibiting fine detail because every pixel of the image includes contributions from SW channel 102 and LW channel 104.

Figure 7:
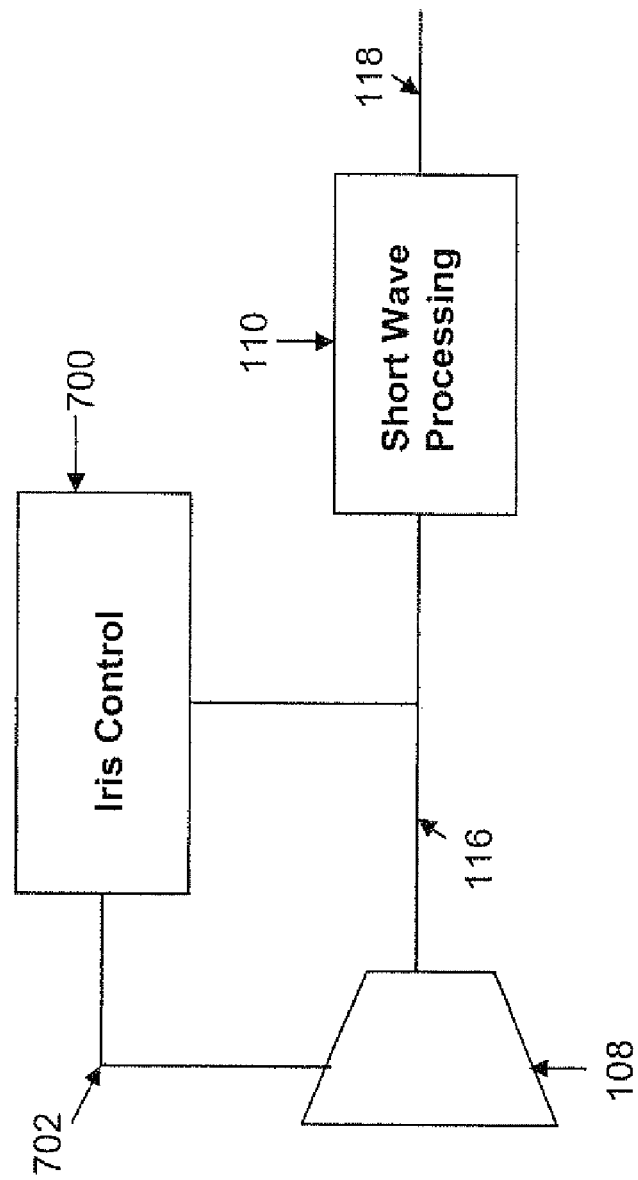
FIG. 7 is a block diagram of the system of FIG. 1 that implements iris control for a short wave detector.

The first embodiment may include an iris control feature, which is depicted in FIG. 7. SW channel 102 may include an iris control unit 700. Iris control unit 700 receives SW HDR signal 116 and produces a control signal 702 to control the position of an iris of SW detection unit 108. Iris control unit 700 processes a set of data from signal 116 that represents a preset minimum area of an image and determines, by electronic filtering, a peak signal level from the set of data. Iris control unit 700 produces control signal 702 that represents the peak signal level. Control signal 702 controls the iris of SW detection unit 108 such that the peak signal level is maintained at a preset level. Because the iris of SW detection unit 108 is controlled based upon the peak signal level instead of the average signal level, saturation caused by bright SW objects, such as runway lights, may be minimized.

Figure 8:
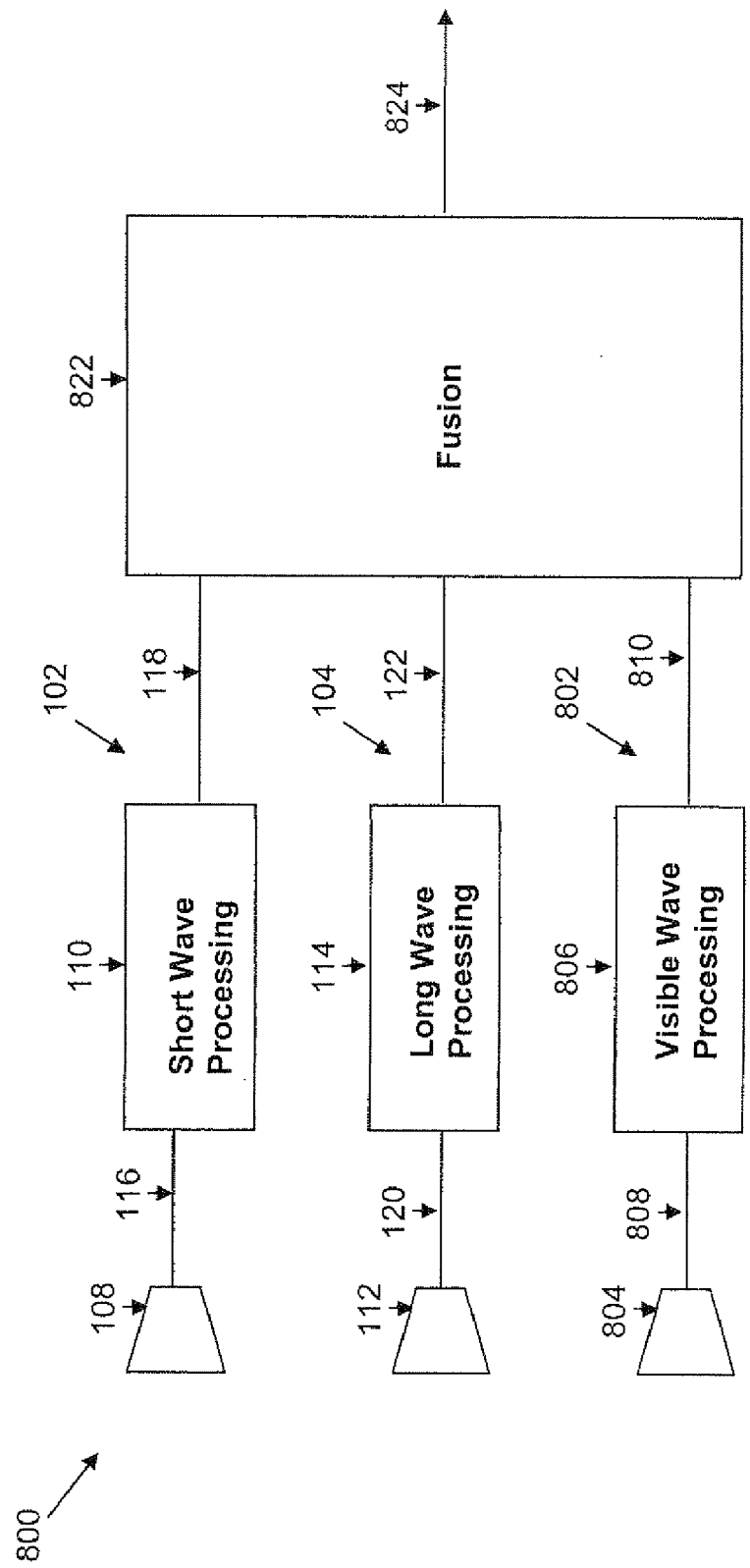
FIG. 8 is a block diagram of a second embodiment of a multi-channel system that implements nonlinear intensity transformation and fusion.

FIG. 8 is a block diagram of a second embodiment of a multi-channel enhanced vision system 800. System 800 includes SW channel 102, LW channel 104, and a visible wave (VW) channel 802 sensitive to visible wavelength radiation. Visible wavelength radiation includes radiation with wavelengths ranging between 0.4 µm and 0.7 µm. For example, VW channel 802 may be sensitive to visible wavelength radiation including visible wave radiation emanating from light emitting diode (LED) runway lights. SW channel 102 and LW channel 104 are similar to the corresponding channels described in system 100. Therefore, detail of SW channel 102 and LW channel 104 in system 800 is not repeated here.

VW channel 802 includes a VW detection unit 804 and a VW processing unit 806. Detection unit 802 may be any camera capable of detecting visible wavelength radiation including, for example, an avalanche CCD camera, a conventional CCD camera, or a CMOS camera. Detection unit 804 may be combined with detection units 108 and 112 into a single detection unit capable of detecting, and distinguishing between, short wavelength, long wavelength, an visible wavelength radiation.

Detection unit 802 detects visible wavelength radiation emanating from a scene and produces a VW high dynamic range (HDR) signal 808 representing the detected visible wavelength radiation. VW HDR signal 808 is processed by VW processing unit 806 to produce a VW low dynamic range (LDR) signal 810. VW LDR signal 810 includes VW image data that represent intensity values—for example, light intensity values—of different pixels of a VW image to be displayed. Different intensity values of the LDR signals 118, 120, and 810 are grouped corresponding to different pixels and are combined on a pixel by pixel basis by a fusion unit 822 to produce a fused signal 824.

Figure 9:
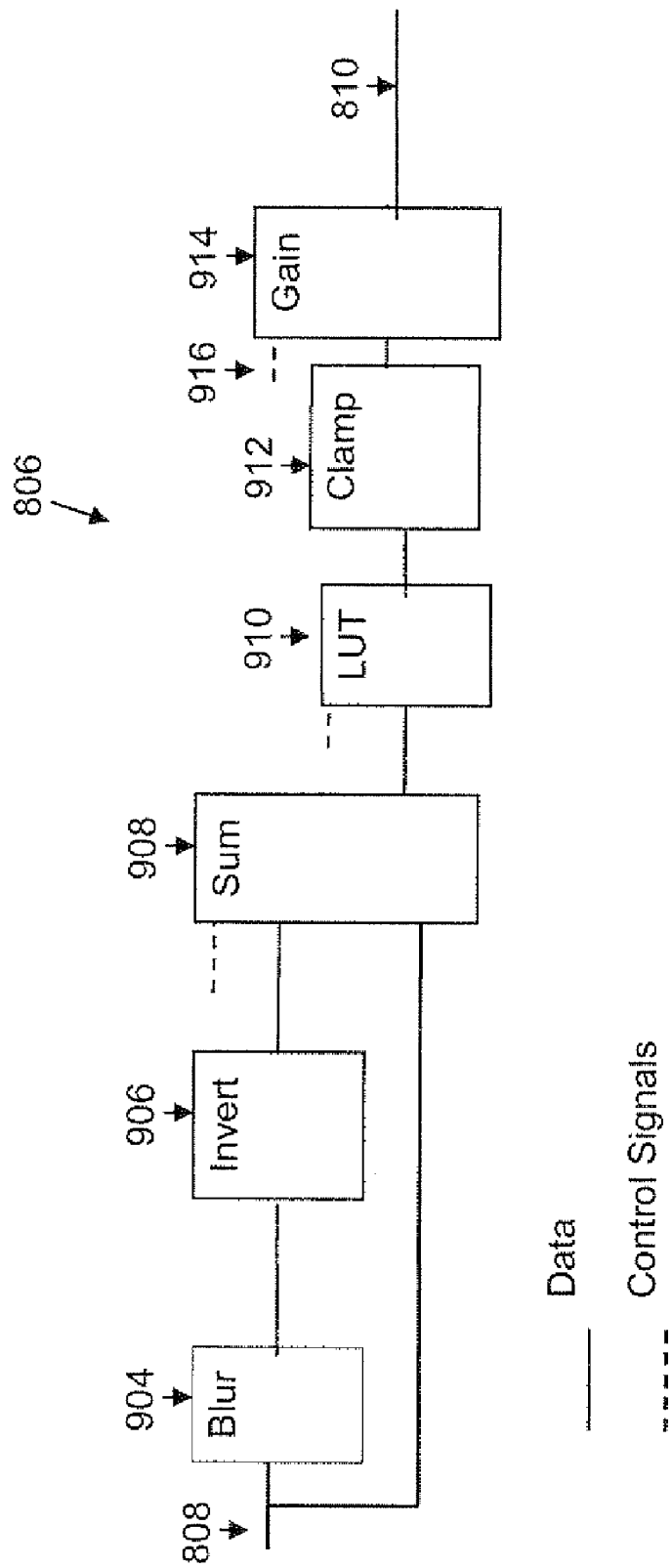
FIG. 9 is a block diagram of a visible wave processing unit of the system of FIG. 8.

VW processing unit 806 will now be described in more detail with reference to FIG. 9. VW processing unit 806 includes a blurring spatial filter 904, an inverting unit 906, a summing unit 908, a dynamic look-up table 910, and a clamping unit 912. Blocks 904, 906, 908, 910, and 912 operate in a manner similar to that of corresponding blocks 204, 206, 208, and 210 of LW processing unit 112 and to that of corresponding blocks 304, 306, 308, 310, and 316 of SW processing unit 110. Therefore, detail of these blocks in system 800 is not repeated here. VW processing unit 806 also includes a variable gain unit 914. A control signal 916 controls an amount of gain applied to VW LDR image data derived from clamping unit 912. Control signal 916 represents an average signal level of SW LDR signal 118. For example, one of two gain levels of variable gain unit 914 may be selected based upon the average signal level of SW LDR signal 118. If the average signal level of SW LDR signal 118 is high, a low gain may be applied to the VW LDR image data. If the average signal level of SW LDR signal 118 is low, a high gain may be applied to the VW LDR image data.

Variable gain unit 914 facilitates production of fine image detail. For example, image detail provided by SW channel 102 and VW channel 810 may be similar and, if slight misalignment between SW channel 102 and VW channel 810 occurs, image detail may be blurred. The gain of VW channel 810 may be minimized during day-time operation of system 800 and maximized during night-time operation.

With reference again to FIG. 8, fusion unit 822 operates in a manner similar to that of fusion unit 106 except fusion unit 822 includes three LDR input signals instead of two. In other words, fusion unit 822 produces fused signal 824 that represents intensity values equal to the weighted addition of SW, LW, and VW intensity values represented in, respectively, signals 118, 122, and 810. Fusion unit 822 may also lower the intensity value of each pixel represented in fused signal 824 by a predetermined amount.

System 800 may include any additional feature described in the first embodiments. For example, system 800 may include distortion correction units 502 and 504 and a corresponding correction unit for VW channel 802 that operates in a similar manner as units 502 and 504. Additionally, SW channel 102 may include iris control unit 700.

It will be obvious to those having skill in the art that many changes may be made to the details of the above-described embodiments without departing from the underlying principles of the invention. The scope of the present invention should, therefore, be determined only by the following claims.

I claim:

1. A method of processing image data derived from radiation emanating from a scene and acquired by a multi-channel enhanced vision system to render an image of the scene for display, the image exhibiting features of spatial regions of the scene in great detail, comprising:
    detecting first and second wavelength bands of radiation emanating from a scene to produce respective first and second sets of high dynamic range image data that include representations of relatively low contrast, high spatial frequency detail of features of spatial regions of the scene;
    performing nonlinear intensity transformation of data derived from the first set and second set of high dynamic range image data to produce, respectively, a first set of low dynamic range image data representing a first low dynamic range detailed image of the scene and a second set of low dynamic range image data representing a second low dynamic range detailed image of the scene, the nonlinear intensity transformation substantially preserving or enhancing in the first and second low dynamic range detailed images the relatively low contrast, high spatial frequency detail of features of the spatial regions of the scene represented in the first and second sets of high dynamic range image data; and
    combining the first low dynamic range detailed image and the second low dynamic range detailed image to form a fused image that, when rendered on a display, exhibits in great detail the features of the spatial regions of the scene.

2. The method of claim 1, in which:
    the first set of low dynamic range image data represents a first set of intensity values of pixels of the first low dynamic range detailed image,
    the second set of low dynamic range image data represents a second set of intensity values of pixels of the second low dynamic range image,
    different intensity values of the first set are paired with associated intensity values of the second set to form different pairs of associated intensity values,
    the fused image includes pixels having intensity values, and
    the combining to form the fused image comprises performing weighted addition of the intensity values of each of the different pairs of associated intensity values to produce the intensity values of the pixels of the fused image.

3. The method of claim 1, in which the first and second wavelength bands are at least partly non-overlapping.

4. The method of claim 3, in which a wavelength range of the first wavelength band is between about 0.7 µm and about 3 µm and a wavelength range of the second wavelength band is between about 3 µm and about 15 µm.

5. The method of claim 1, further comprising:
    detecting a third wavelength band of radiation emanating from the scene to produce a third set of high dynamic range image data that includes representations of relatively low contrast, high spatial frequency detail of features of spatial regions of the scene;
    performing nonlinear intensity transformation of data derived from the third set of high dynamic range image data to produce a third set of low dynamic range image data representing a third low dynamic range detailed image of the scene;
    combining the first, second, and third detailed images to form the fused image.

6. The method of claim 5, further comprising:
    producing first, second, and third sets of high-pass filtered image data from respectively, the first, second, and third sets of high dynamic range image data by:
        blurring the first, second, and third sets of high dynamic range image data,
        inverting the blurred first, second, and third sets of high dynamic range image data to form first, second, and third sets of inverted blurred high dynamic range image data, and
        combining the first, second, and third sets of high dynamic range image data with, respectively, the first, second, and third sets of inverted blurred high dynamic range image data; and
    performing the nonlinear intensity transformation to the first, second, and third sets of high-pass filtered image data to produce, respectively, the first, second, and third sets of low dynamic range image data.

7. The method of claim 5, in which a wavelength range of the first wavelength band is between about 0.7 µm and about 3 µm, a wavelength range of the second wavelength band is between about 3 µm and about 15 µm, and a wavelength range of the third wavelength band is between about 0.4 µm and about 0.7 µm.

8. The method of claim 1, further comprising:
    producing first and second sets of high-pass filtered image data from, respectively, the first and second sets of high dynamic range image data; and
    performing the nonlinear intensity transformation to the first and second sets of high-pass filtered image data to produce, respectively, the first and second sets of low dynamic range image data.

9. The method of claim 8, in which the first and second sets of high-pass filtered image data are produced by:
    blurring the first and second sets of high dynamic range image data;

inverting the blurred first and second sets of high dynamic range image data to form first and second sets of inverted blurred high dynamic range image data; and combining the first and second sets of high dynamic range image data with, respectively, the first and second sets of inverted blurred high dynamic range image data.

10. The method of claim 1, in which the nonlinear intensity transformation of the data derived from the second set of high dynamic range image data produces a set of high frequency, low dynamic range image data, the method further comprising:

applying to data derived from the second set of high dynamic range image data a gain and level adjustment to produce a set of low frequency, low dynamic range image data; and combining the set of high frequency, low dynamic range image data with the set of low frequency, low dynamic range image data to produce the second set of low dynamic range image data that represents the second low dynamic range image.

11. The method of claim 1, in which a wavelength range of the first wavelength band is between about 0.4 μm and about 0.7 μm and a wavelength range of the second wavelength band is between about 3 μm and about 15 μm.

12. A method of processing image data derived from radiation emanating from a scene and acquired by a multi-channel enhanced vision system to render an image of the scene for display, the image exhibiting features of spatial regions of the scene with high brightness and in great detail, comprising:

detecting first and second wavelength bands of radiation emanating from a scene to produce respective first and second sets of image data that include representations of relatively low contrast, high spatial frequency detail of features of spatial regions of the scene;

performing nonlinear intensity transformation of data derived from the first set and second set of image data to produce, respectively, a first set of low dynamic range image data representing a first set of intensity values of pixels of a first image of the scene and a second set of low dynamic range image data representing a second set of intensity values of pixels of a second image of the scene;

performing distortion correction to the first set of intensity values to form corrected intensity values of the pixels of the first image, the corrected intensity values being paired with intensity values of the second set to form different pairs of associated intensity values, the distortion correction to an intensity value of the first set corresponding to a first pixel of the first image comprising:

selecting a first set of predetermined offset values that identify intensity values of the first set corresponding to a first group of adjacent pixels of the first image;

selecting a first set of predetermined weight values for the adjacent pixels in the first group;

determining a first weighted average intensity value based on the first set of weight values and the intensity values of the first set corresponding to the first group of adjacent pixels; and assigning the first weighted average intensity value as a corrected intensity value of the first pixel; and combining the associated intensity values of the different pairs to form fused image data representing brightness levels of pixels forming a fused image that, when rendered on a display, exhibits with high brightness and in great detail the features of the spatial regions of the scene.

13. The method of claim 12, in which the first set of image data represents the intensity values of the first set and the distortion correction is performed before the performance of nonlinear intensity transformation.

14. The method of claim 12, in which the first set of predetermined offset values and the first set of predetermined weight values are stored in and selected from a look-up table.

15. The method of claim 12, further comprising performing the distortion correction to the second set of intensity values to form corrected intensity values of the pixels of the second image, in which the distortion correction to an intensity value of the second set corresponding to a second pixel comprises:

selecting a second set of predetermined offset values that identify intensity values of the second set corresponding to a second group of adjacent pixels;

selecting a second set of predetermined weight values for the adjacent pixels in the second group;

determining a second weighted average intensity value based on the second set of weight values and the intensity values of the second set corresponding to the second group of adjacent pixels; and assigning the second weighted average intensity value as a corrected intensity value of the second pixel.

16. A method of processing image data derived from radiation emanating from a scene and acquired by a multi-channel enhanced vision system to render an image of the scene for display, the image exhibiting features of spatial regions of the scene with high brightness and in great detail, comprising:

detecting first and second wavelength bands of radiation emanating from a scene to produce respective first and second sets of image data that include representations of relatively low contrast, high spatial frequency detail of features of spatial regions of the scene;

performing nonlinear intensity transformation of data derived from the first set and second set of image data to produce, respectively, a first set of low dynamic range image data representing a first set of intensity values and a second set of low dynamic range image data representing a second set of intensity values;

adjusting intensity values of the first set representing negative-going excursions to reduce perception of visible artifacts of the image of the scene, the adjusting producing a third set of intensity values, and different pairs of associated intensity values of the second and third sets corresponding to different pixels forming the image of the scene; and combining the associated intensity values of the different pairs to form fused image data representing brightness levels of the pixels forming the image that, when rendered on a display, exhibits with high brightness and in great detail the features of the spatial regions of the scene.

17. A method of processing image data derived from radiation emanating from a scene and acquired by a multi-channel enhanced vision system to render an image of the scene for display, the image exhibiting features of spatial regions of the scene with high brightness and in great detail, comprising:

detecting first, second, and third wavelength bands of radiation emanating from a scene to produce respective first, second, and third sets of image data that include representations of relatively low contrast, high spatial frequency detail of features of spatial regions of the scene;

performing nonlinear intensity transformation of data derived from the first, second, and third sets of image data to produce, respectively, a first set of low dynamic range image data representing a first set of intensity values, a second set of low dynamic range image data representing a second set of intensity values, and a third set of low dynamic range image data representing a third set of intensity values;

determining an average value of the intensity values of the first set;

adjusting the intensity values of the third set according to the determined average value such that the intensity values of the third set are decreased corresponding to an increase of the average value of the first set, the adjusting producing a fourth set of intensity values, and different groups of associated intensity values of the first, second, and fourth sets corresponding to different pixels forming an image of the scene; and combining the associated intensity values of the different groups to form fused image data representing brightness levels of the pixels forming an image that, when rendered on a display, exhibits with high brightness and in great detail the features of the spatial regions of the scene.

18. The method of claim 17, further comprising adjusting intensity values of the first and third sets representing negative-going excursions to reduce perception of visible artifacts of the image of the scene.

19. The method of claim 17, further comprising:
producing first, second, and third sets of high-pass filtered image data from respectively, the first, second, and third sets of high dynamic range image data, the first, second, and third sets of high-pass filtered image data being produced by:
blurring the first, second, and third sets of high dynamic range image data,
inverting the blurred first, second, and third sets of high dynamic range image data to form first, second, and third sets of inverted blurred high dynamic range image data, and
combining the first, second, and third sets of high dynamic range image data with, respectively, the first, second, and third sets of inverted blurred high dynamic range image data; and
performing the nonlinear intensity transformation to the first, second, and third sets of high-pass filtered image data to produce, respectively, the first, second, and third sets of low dynamic range image data.

20. The method of claim 17, in which a wavelength range of the first wavelength band is between about 0.7 µm and about 3 µm, a wavelength range of the second wavelength band is between about 3 µm and about 15 µm, and a wavelength range of the third wavelength band is between about 0.4 µm and about 0.7 µm.

21. A method of processing image data derived from radiation emanating from a scene and acquired by a multi-channel enhanced vision system to render an image of the scene for display, the image exhibiting features of spatial regions of the scene with high brightness and in great detail, comprising:
detecting first and second wavelength bands of radiation emanating from a scene to produce respective first and second sets of image data that include representations of relatively low contrast, high spatial frequency detail of features of spatial regions of the scene;
identifying a subset of the image data of the first set;
determining a peak intensity level of the first wavelength band of radiation represented in the subset;
producing a control signal representing the peak intensity level;
regulating an amount of radiation detected in the first wavelength band in response to the control signal to reduce saturation caused by image features of the scene represented in the first wavelength band of radiation;
performing nonlinear intensity transformation of data derived from the first set and second set of image data to produce, respectively, a first set of low dynamic range image data representing a first set of intensity values and a second set of low dynamic range image data representing a second set of intensity values, different pairs of associated intensity values of the first and second sets corresponding to different pixels forming an image of the scene; and
combining the associated intensity values of the different pairs to form fused image data representing brightness levels of the pixels forming an image that, when rendered on a display, exhibits with high brightness and in great detail the features of the spatial regions of the scene.

22. The method of claim 21, in which a wavelength range of the first wavelength band is between about 0.7 µm and about 3 µm.

23. A multi-channel enhanced vision system for processing image data derived from radiation emanating from a scene and acquired by the multi-channel enhanced vision system to render an image of the scene for display, comprising:
a first channel configured to detect a first wavelength band of radiation emanating from a scene and produce a first set of high dynamic range image data including representations of relatively low contrast, high spatial frequency detail of features of spatial regions of the scene, the first channel comprising:
a first conversion unit implemented with a nonlinear intensity transformation for transforming data derived from the first set of high dynamic range image data to produce a first set of low dynamic range image data representing a first low dynamic range detailed image of the scene, the first conversion unit configured to substantially preserve or enhance in the first low dynamic range detailed image the relatively low contrast, high spatial frequency detail of the features of the spatial regions of the scene represented in the first set of high dynamic range image data;
a second channel configured to detect a second wavelength band of radiation emanating from a scene and produce a second set of high dynamic range image data including representations of relatively low contrast, high spatial frequency detail of features of spatial regions of the scene, the second channel comprising:
a second conversion unit implemented with a nonlinear intensity transformation for transforming data derived from the second set of high dynamic range image data to produce a second set of low dynamic range image data representing a second low dynamic range detailed image of the scene, the second conversion unit configured to substantially preserve or enhance in the second low dynamic range detailed image the relatively low contrast, high spatial frequency detail of the features of the spatial regions of the scene represented in the second set of high dynamic range image data; and
a fusion unit configured to combine the first low dynamic range detailed image and the second low dynamic range detailed image to form a fused image that, when rendered on a display, exhibits in great detail the features of the spatial regions of the scene.

24. The system of claim 23, in which the first set of low dynamic range image data includes representations of a first set of intensity values of pixels of the first low dynamic range detailed image, and in which the second set of low dynamic range image data includes representations of a second set of intensity values of pixels of the second low dynamic range image, the system further comprising:

a first distortion correction unit configured to perform distortion correction to an intensity value of the first set, in which the first distortion correction unit is configured to identify the first set of intensity values corresponding to a first group of adjacent pixels of the first low dynamic range detailed image and determine a first weighted average of the first set of intensity values corresponding to the first group of adjacent pixels; and a second distortion correction unit configured to perform distortion correction to an intensity value of the second set, in which the second distortion correction unit is configured to identify the second set of intensity values corresponding to a second group of adjacent pixels of the second low dynamic range detailed image and determine a second weighted average of the second set of intensity values corresponding to the second group of adjacent pixels.

25. The system of claim 23, further comprising:

a third channel configured to detect a third wavelength band of radiation emanating from a scene to produce a third set of high dynamic range image data including representations of relatively low contrast, high spatial frequency detail of features of spatial regions of the scene, the third wavelength channel comprising a third conversion unit implemented with a nonlinear intensity transformation for transforming data derived from the third set of high dynamic range image data to produce a third set of low dynamic range image data representing a third low dynamic range detailed image of the scene, the fusion unit configured to combine the first, second, and third detailed images to form the fused image.

* * * * *